United States Patent
Kitahara et al.

(10) Patent No.: US 6,781,771 B2
(45) Date of Patent: Aug. 24, 2004

(54) OBJECTIVE LENS FOR OPTICAL RECORDING MEDIUM AND OPTICAL PICKUP DEVICE USING IT

(75) Inventors: Yu Kitahara, Saitama (JP); Toshiaki Katsuma, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/445,870

(22) Filed: May 28, 2003

(65) Prior Publication Data

US 2003/0223124 A1 Dec. 4, 2003

(30) Foreign Application Priority Data

May 30, 2002 (JP) ........................................ 2002-156854

(51) Int. Cl.[7] .......................... G02B 3/02; G02B 3/00; G11B 7/135; G11B 7/00
(52) U.S. Cl. ............. 359/719; 369/112.03; 369/112.07; 369/112.23; 359/722
(58) Field of Search ................................ 359/719, 722, 359/112.03, 112.07, 112.23

(56) References Cited

U.S. PATENT DOCUMENTS

| | | | |
|---|---|---|---|
| 6,337,841 B1 * | 1/2002 | Kim et al. ............. | 369/112.06 |
| 6,449,237 B1 * | 9/2002 | Yoo et al. ............... | 369/112.05 |
| 6,542,314 B2 | 4/2003 | Kawabata et al. .......... | 359/719 |
| 6,687,209 B2 * | 2/2004 | Ota et al. ............... | 369/112.08 |
| 2002/0003767 A1 | 1/2002 | Ota et al. ............... | 369/112.09 |
| 2002/0089764 A1 | 7/2002 | Ikenaka et al. ............. | 359/719 |
| 2003/0133195 A1 * | 7/2003 | Ikenaka ....................... | 359/574 |

\* cited by examiner

*Primary Examiner*—David N. Spector
(74) *Attorney, Agent, or Firm*—Arnold International; Bruce Y. Arnold

(57) ABSTRACT

An objective lens and optical pickup device that uses it is disclosed having an optical diffraction surface on its surface nearest a light source which may be switched in wavelength for either CD or DVD recording/replaying. The optical diffraction surface causes a selected wavelength beam to converge or diverge more than the other wavelength beam. Superimposed in a peripheral region of the diffraction grating is a step change in height (higher or lower) which causes destructive interference for light in the peripheral region for only one of the beams. In this way, an objective lens is provided that, with a simple and compact structure, enables a light beam to be converged accurately into a spot on a selected recording medium, despite the need to have the converged beam have different wavelengths and numerical apertures, depending on the recording medium used.

32 Claims, 5 Drawing Sheets

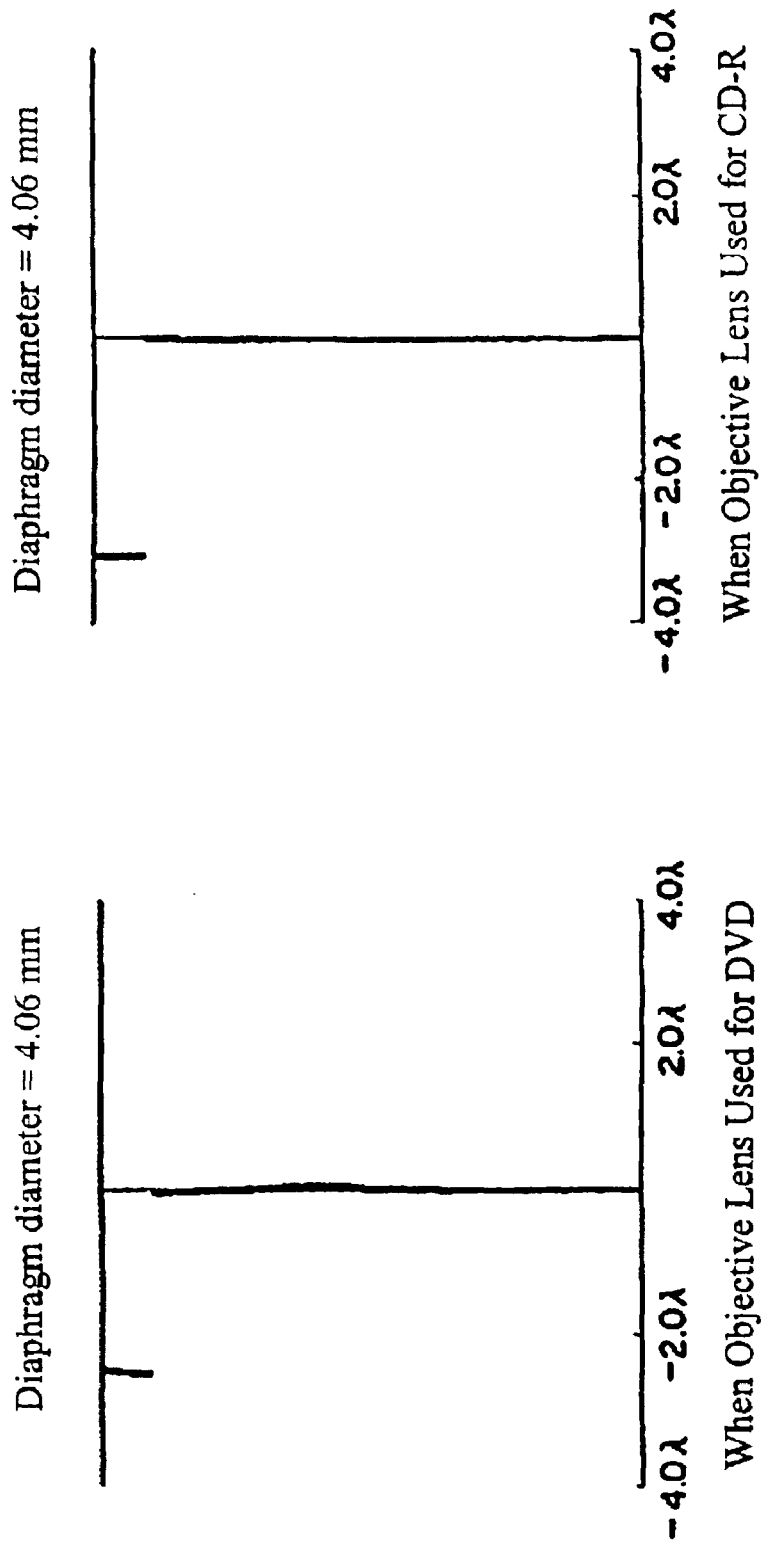

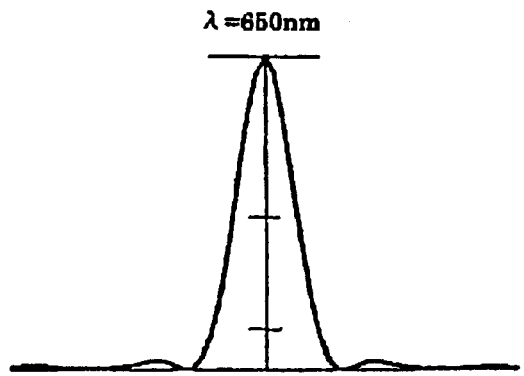
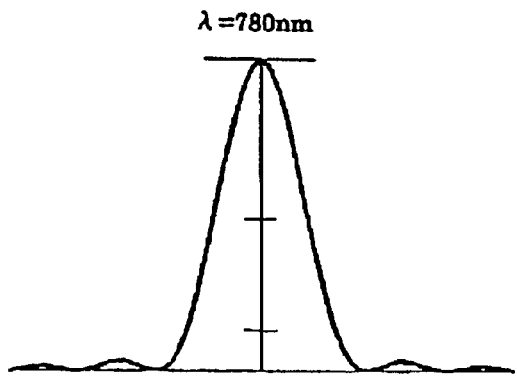
Fig. 5(a)  Fig. 5(b)
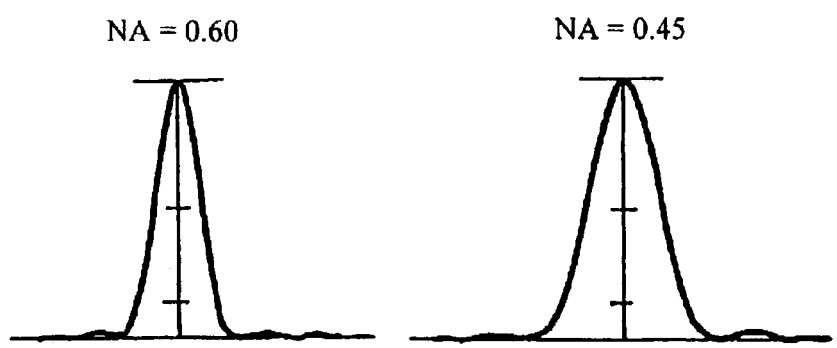
Fig. 6(a)  Fig. 6(b)
(PRIOR ART)  (PRIOR ART)

OBJECTIVE LENS FOR OPTICAL RECORDING MEDIUM AND OPTICAL PICKUP DEVICE USING IT

BACKGROUND OF THE INVENTION

In recent years, various optical media have been developed, and an optical pickup device that can record/ replay using multiple types of common optical recording media is known. For example, a device that records/replays using one optical pickup device with either a DVD (Digital Versatile Disc) recording medium or a CD (Compact Disc including CD-ROM, CD-R and CD-RW) recording medium is known. In order to improve the recording density using a DVD, it is required to use visible light having, for example, a wavelength of approximately 650 nm. On the other hand, because a CD does not have any sensitivity for light in the visible light region, it is necessary to use near-infrared light having a wavelength of approximately 780 nm. Therefore, optical pickup devices that can be used with either of these media rely on a so-called two-wavelength beam method wherein two different wavelengths are used to irradiate the recording medium for recording/playback.

In addition, in the two optical recording media devices as discussed above, it is necessary to employ different numerical apertures depending on the wavelength used. For example, in the technical standards for DVDs, the numerical aperture is established at 0.6, while in the technical standards for CDs, the numerical aperture is established at 0.45. Consequently, in order to obtain the required different numerical apertures for the selected optical recording media, either a variable aperture diaphragm is interposed that may be formed of a liquid crystal shutter or a filter having a wavelength selectivity, or different diaphragms are mechanically switched into the light path of the irradiating beam. The inventors of the present application have already disclosed a construction in Japanese Laid-Open Patent Application 2002-117569 wherein a peripheral portion, which functions to reduce/eliminate light at the periphery of a central light flux due to interference for light having one wavelength and also functions to maintain a quantity of light at the periphery of a central light flux for light having the other wavelength, is formed on one surface of an objective lens. Using such an arrangement obviates the need for a diaphragm as used in the prior art to provide different numerical apertures, so that a compact size and a low price for an optical pickup device is realized.

In the two optical recording media mentioned above, the thickness of the optical disc is 0.6 mm in the case of using a DVD versus 1.2 mm in the case of using a CD. As mentioned previously, because the thicknesses of the discs in the two optical recording media are different, the thickness of the protective layers are different, and thus the amount of spherical aberration generated will be different for DVD versus CD recording/replaying.

In the objective lens and the pickup device of Japanese Laid-Open Patent Application 2002-117569, the construction in the case of recording/replaying using a DVD is such that a substantially collimated laser beam is incident onto the objective lens. On the other hand, in the case of recording/ replaying using a CD, the construction is such that a slightly diverging laser beam is incident onto the objective lens. Consequently, even though the amount of spherical aberration that is generated varies when using a DVD versus a CD as the recording/replaying medium, the construction is such that the laser beam can be converged to a proper spot size for recording/replaying using a laser beam of an appropriate wavelength for the selected medium while using the same objective lens.

If a substantially collimated light beam is incident onto the objective lens when using a DVD, the construction is such that an optimum converging effect is provided by the objective lens. At the same time, a light source corresponding to the other optical recording medium (for example, a CD) is arranged at a position so as to provide the best optical performance possible for CDs. Therefore, the position of the light source corresponding to the other optical recording medium is limited. This results in the degree of freedom in designing the optical pickup being low and also requires accuracy in assembly. However, if a substantially collimated light beam were to be incident onto both optical recording mediums, and if the objective lens could display the optimum converging effect for each optical recording medium, the degree of freedom in designing the optical pickup would become high. Such a design would also be effective for achieving a compact size, for easing the accuracy of assembly that is required, and for lowering costs.

BRIEF SUMMARY OF THE INVENTION

The present invention relates to an objective lens for an optical recording medium that can efficiently converge either of the two different irradiating beams required when using a device that can record onto either a DVD or CD wherein the numerical aperture of the used optical system and the wavelength of the radiation used differ from each other. Also, the present invention relates to an optical pickup device that uses such an objective lens.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4($a$) and 4($b$) are wavefront aberration diagrams for the objective lens that is shown in FIGS. 3($a$) and 3($b$), when used with a DVD and a CD recording medium, respectively;

FIGS. 5($a$) and 5($b$) show beam profiles (for DVD recording/replaying and CD recording/replaying, respectively) of the focused light shown in FIGS. 3($a$) and 3($b$), respectively, in the case of condensing light for recording/replaying using the objective lens of FIGS. 3($a$) and 3($b$); and FIGS. 6($a$) and 6($b$) show beam profiles in the case of condensing light by a conventional objective lens for DVD recording/replaying and CD recording/replaying, respectively.

DETAILED DESCRIPTION

Figure 1:
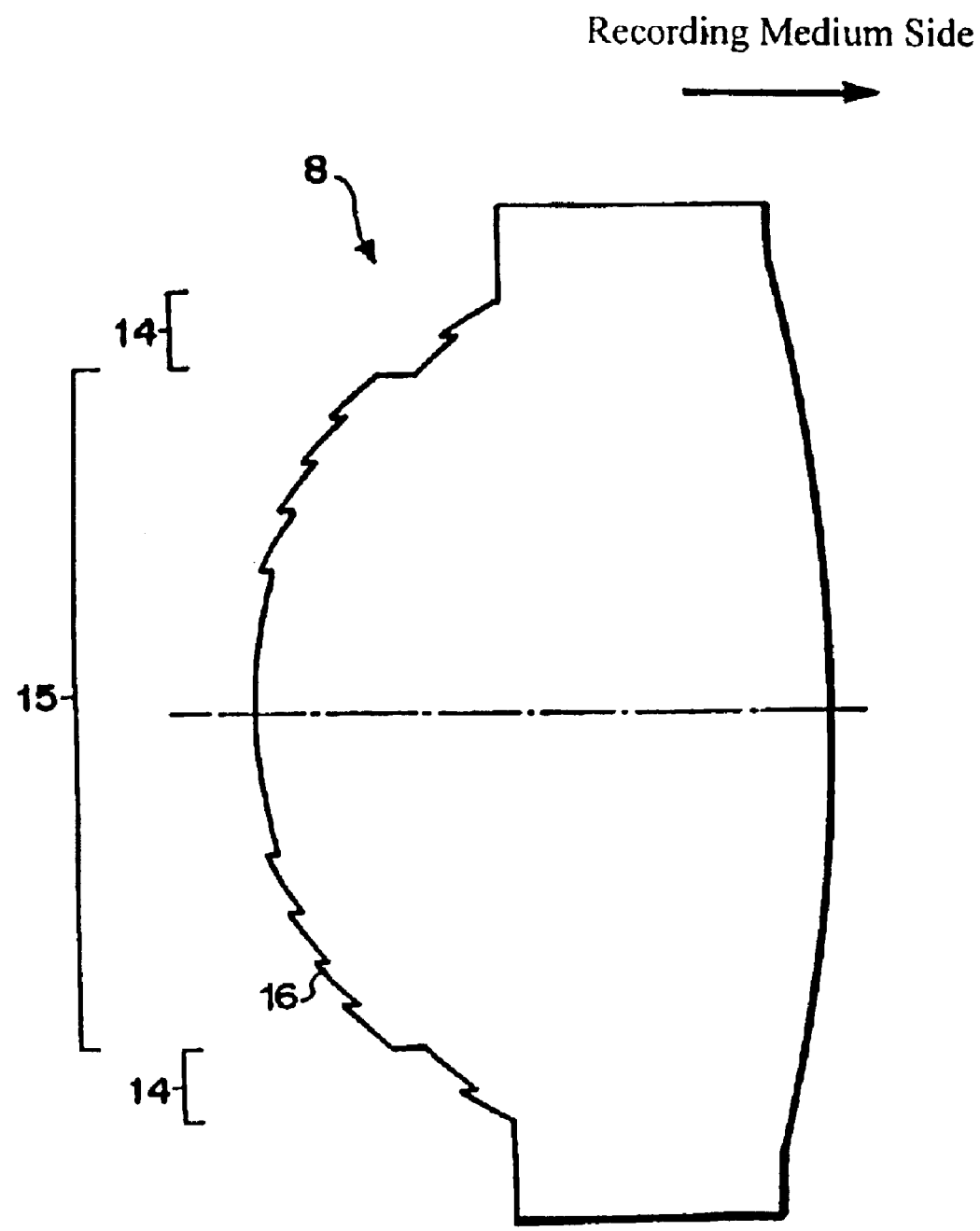
FIG. 1 shows a typical configuration of an objective lens for an optical recording medium relating to an embodiment of the present invention.

The present invention provides an objective lens for an optical recording medium that does not complicate the structure of an optical pickup device, is compact, and is low in cost. At the same time, the objective lens is such that one can select the numerical aperture and the converging effect corresponding to either the DVD or CD technical standards. In addition, the present invention provides an optical pickup device using such an objective lens.

An optical diffraction surface is provided on one surface of an objective lens for an optical recording medium that is for the purpose of converging a selected wavelength light beam at a desired position relative to a first optical recording medium corresponding to a first numerical aperture and a first wavelength, and at a desired position relative to a second optical recording medium corresponding to a second numerical aperture and a second wavelength. The optical diffraction surface is formed on the surface of the objective lens nearest the light source and can be selected so as to have either a diverging effect or a converging effect that is small relative to light having the first wavelength, and this luminous flux is converged at a first predetermined position due to the refractive power of the the objective lens. On the other hand, the refractive effect is large relative to light having the second wavelength and this luminous flux is converged at a second predetermined position due to the refractive power of the objective lens. A peripheral portion for aperture adjustment is established on the surface of the objective lens nearest the light source and, when the first wavelength is $\lambda_2$ and the second wavelength is $\lambda_1$, the peripheral portion for aperture adjustment functions so as to reduce/eliminate the quantity of light at the periphery of a central light flux due to the interference effect for light of wavelength $\lambda_1$, and functions so as to maintain the quantity of light at the periphery of a central light flux for light of wavelength $\lambda_2$. The peripheral portion has a step difference where light which passes through a region equivalent in location to the peripheral portion in the case when it is assumed that the peripheral portion does not exist, and a light which passes through a position where the peripheral portion is formed, generate a phase difference so as to satisfy the following Conditions (1) and (2):

$\Delta_{\lambda 1}=(2m+1)\lambda_1/2+\delta 1$  Condition (1)

$\Delta_{\lambda 2}=n\lambda_2+\delta 2$  Condition (2)

and, the numerical aperture at the location of a boundary of the step difference has a value between the first numerical aperture and the second numerical aperture, where $\Delta_{\lambda 1}$ is the phase difference, for light of wavelength $\lambda_1$, between light passing through a position equivalent to that of the peripheral portion in the case when it is assumed that the peripheral portion does not exist, and light passing through a position where the peripheral portion is formed;

$\Delta_{\lambda 2}$ is the phase difference, for light of wavelength $\lambda_2$, between light passing through a position equivalent to that of the peripheral portion in the case when it is assumed that the peripheral portion does not exist, and light passing through the position where the peripheral portion is formed;

m and n are integers;

$\delta 1$ is a phase shift amount at the wavelength $\lambda_1$, with $|\delta 1|<0.2\ \lambda_1$; and, $\delta 2$ is a phase shift amount at the wavelength $\lambda_2$, with $|\delta 2|<0.2\ \lambda_2$.

Also, it is preferable that an aspheric surface is formed on the light-source-side surface of the above-mentioned objective lens.

Further, the following Condition (3) is preferably satisfied:

$\lambda_1>\lambda_2$  Condition (3)

where $\lambda_1$ is the second wavelength, and $\lambda_2$ is the first wavelength.

It is also preferable that the optical diffraction surface shall be comprised of a concentric circle grating that has a saw-tooth cross-sectional configuration and that the beams at the first wavelength and the second wavelength that are incident onto the objective optical lens are substantially collimated.

An optical pickup device for the present invention is characterized by the fact that it is equipped with the above-mentioned objective lens for an optical recording medium.

For the case of an optical diffraction surface, the wording "a diverging effect or a converging effect that is small relative to light having the first wavelength" shall be construed to include the case where the selected effect is zero.

An embodiment of the present invention will now be explained with reference to the drawings.

Figure 2:
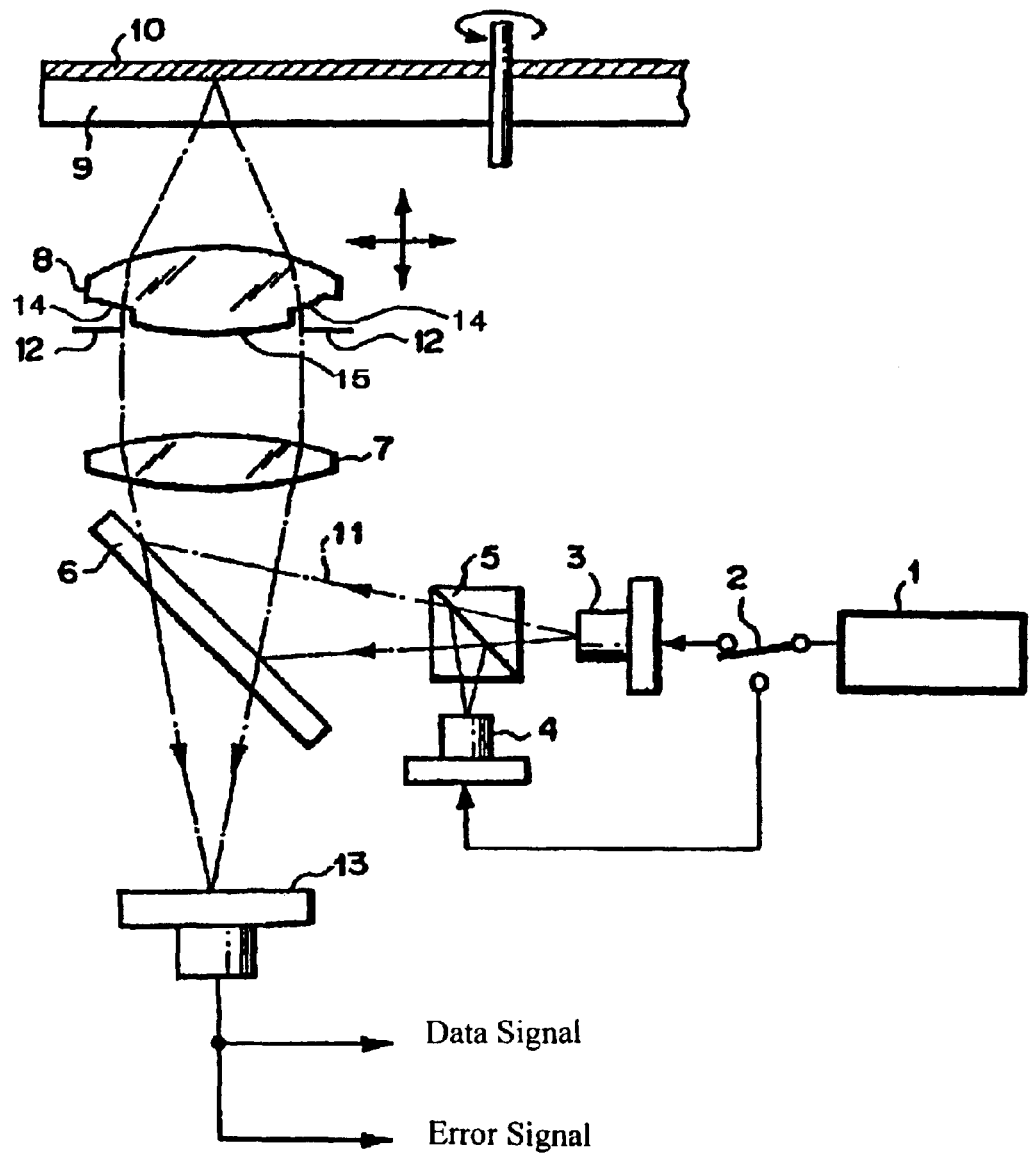
FIG. 2 shows an optical pickup device using the objective lens for an optical recording medium relating to the embodiment of the present invention.

FIG. 1 shows a typical configuration of an objective lens for an optical recording medium according to an embodiment of the present invention, and FIG. 2 shows an optical pickup device that uses the objective lens shown in FIG. 1.

In the optical pickup device, as shown in FIG. 2, a laser beam 11, which may include light emitted from one of the semiconductor lasers 3 and 4 due to the supply of electric power to a selected one of these semiconductor lasers from a power source 1, is reflected by a partially reflective mirror 6. The laser beam 11 is made to be substantially collimated by a collimator lens 7, and an objective lens 8 converges the light onto an optical recording medium within a recording region 10 of an optical disc 9. Furthermore, the semiconductor laser 3 emits a laser beam in the near-infrared region having a wavelength $\lambda_1$ of approximately 780 nm for CD series recording/replaying (CD-R is representative of this series) and the semiconductor laser 4 emits a laser beam in the visible region having a wavelength $\lambda_2$ of 650 nm for DVD recording/replaying. The laser beam, which is formed of light which has been emitted from either the semiconductor laser 3 or the semiconductor laser 4, then enters the prism 5 which directs the light to a partially reflective mirror 6. A switch 2 is arranged between the power source 1 and the semiconductor lasers 3 and 4 for selecting which of the semiconductor lasers 3 or 4 is energized at a given time. In addition, a diaphragm 12 is arranged at a specific position on the light source side of the objective lens 8.

As mentioned previously, the optical pickup device of the present invention is constructed so as to enable recording/replaying of signals using either a CD-R or a DVD as the optical disc 9. Signal information is recorded in pits that are arranged in a track within the recording region 10 of the optical disc 9, and light of the laser beam 11 that is reflected from the recording region 10 is incident onto the partially reflective mirror 6 via the objective lens 8 and the collimator lens 7. A portion of the light that is reflected from the recording region 10 then passes through the partially reflective mirror 6 and enters a photo diode 13 that has been divided into 4 quadrants. In the photo diode 13, the amount of light received at each of the four quadrant positions is detected, and based on the relative amount of light received in each quadrant, a tracking signal, a data signal, and a focus detecting signal are obtained in a known manner.

Furthermore, the partially reflective mirror 6 has its surface normal tilted 45° relative to the optical path of the light returned from the optical disc 9. A light beam which has passed through the partially reflective mirror 6 will have astigmatism. The focus error amount is determined depending upon the configuration of the beam spot of this returned light on the photo diode 13 that has been divided into four quadrants.

In the case of the optical disc 9 being a CD-R or a DVD, a protective layer of polycarbonate having a refractive index $n_d$ of 1.514 is provided. For CD-Rs, the geometrical thickness of this protective layer is set at 1.2 mm. For DVDs, the thickness is set at 0.6 mm. Because the disc thicknesses in these two optical recording media are different, the amount of spherical aberration that is generated due to the thickness difference of the protective layers also is different. Therefore, in order to provide accurate focusing for each type of optical disc 9, it is necessary to correct the amount of spherical aberration to that which is most suitable for a given used wavelength in recording/replaying. This requires that a lens construction be used which has a different converging effect on the light at the two different wavelengths that are used for CD-R versus DVD recording/replaying.

Thus, in the optical pickup device of the present invention, as with the objective lens 8 that is shown in FIG. 1, an optical diffraction surface, which is formed of a concentric circle grating that is integrally molded with a lens base material is formed on the surface 16 of the lens that is on the light source side (hereinafter termed the 'first surface'). The optical diffraction surface is constructed so as to have a saw-tooth cross-sectional configuration which enables excellent quality recording/replaying using an optical disc 9 that may be either a CD-R or a DVD. In FIG. 1, the saw-tooth configuration of the optical diffraction surface has been exaggerated in scale, in order that it be clearly visible.

This optical diffraction surface is formed such that the diffraction effect for light of the first wavelength is small and this luminous flux is converged at a first predetermined position by interacting with the refractive power of the objective lens 8. On the other hand, the diffraction effect for light of the second wavelength is large, and this luminous flux is converged at a second predetermined position by interacting with the refractive power of the objective lens 8. Furthermore, the case where the above-mentioned diffraction effect is small includes the situation where the diffraction effect is zero (i.e., the zero-order diffraction light becomes 100% of the light incident onto the optical diffraction surface), and, in this case, the luminous flux is converged at the first predetermined position due to the refractive power of the objective lens 8 for light of the first wavelength.

In the present embodiment, the above-mentioned first wavelength corresponds to the laser beam that has a wavelength 650 nm ($\lambda_2$) for the DVD, and the above-mentioned second wavelength corresponds to the laser beam that has the wavelength 780 nm ($\lambda_1$) for the CD-R. This optical diffraction lens surface is formed so as to, in combination with the refractive power of the objective lens 8, converge the first-order diffraction beams of these wavelengths onto the recording region of the selected recording media.

The phase difference function $\emptyset(Y)$ for the optical diffraction surface is given by Equation (1) below:

$$\emptyset(Y)=W_1Y^2+W_2Y^4+W_3Y^6+W_4Y^8+W_5Y^{10} \qquad \text{Equation (1)}$$

where

Y is the distance from the optical axis; and, $W_1$, $W_2$, $W_3$, $W_4$ and $W_5$ are coefficients of the phase difference function.

Furthermore, when the wavelength is $\lambda$ and the phase difference function for the optical diffraction surface is $\emptyset(Y)$, the optical path difference function OPD for the optical diffraction surface is given by: OPD=$\lambda \times \emptyset(Y)/2\pi$.

Figure 3A:
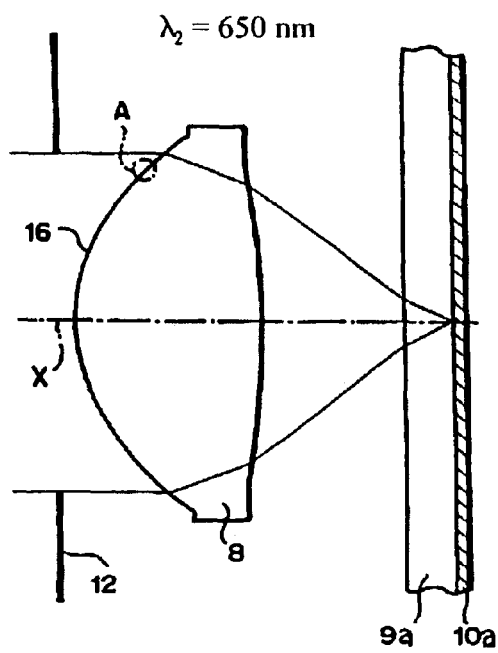
FIGS. 3($a$) and 3($b$) show the focusing of light at two different wavelengths (for DVD recording/replaying and CD recording/replaying, respectively) of an objective lens onto an optical recording medium relating to the embodiment of the present invention, and FIG. 3($c$) shows a partial, cross-sectional view of this objective lens.

The effect due to the optical diffraction surface will now be explained using FIGS. 3(a) and 3(b). As shown in FIG. 3(a), if a DVD 9a is arranged at a predetermined position (i.e., on a turntable) for recording/replaying, the design is such that a laser beam which has a wavelength 650 nm ($\lambda_2$) from the semiconductor laser 4 is made to be incident onto the objective lens 8. In this case, the collimator lens 7 (FIG. 2) substantially collimates the laser beam, and this light is accurately converged to a spot onto a recording region 10a of the DVD 9a.

Figure 3B:
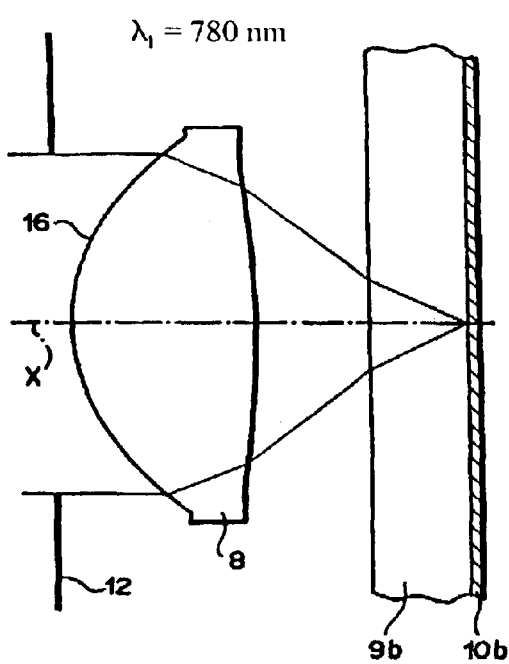

On the other hand, as shown in FIG. 3(b), if a CD-R 9b is arranged at a predetermined position (i.e., on a turntable) and recording/replaying is performed, the design is such that a laser beam of wavelength of 780 nm ($\lambda_1$) that has been emitted by the semiconductor laser 3 will be substantially collimated by the collimator lens 7 and incident onto the objective lens 8. This light will then be converged onto a recording region 10b of the CD-R 9b by the objective lens 8.

The converging effect of the optical diffraction surface is small for the first-order diffraction light of the laser beam when this beam has a wavelength of 650 nm ($\lambda_2$), and the converging effect of the optical diffraction surface for the first-order diffraction light of the laser beam is large when this beam has a wavelength of 780 nm ($\lambda_1$). In either case, the first-order diffraction light from the optical diffraction surface is refracted by the refractive power of the objective lens 8. The optical diffraction surface favorably corrects for the different spherical aberration that is generated due to the difference in thickness between the different optical recording media 9a and 9b. Due to the difference in the converging effect of the optical diffraction surface at the wavelengths $\lambda_1$ and $\lambda_2$ both light beams are accurately converged into a spot at a corresponding recording region 10b or 10a, respectively.

Furthermore, in the present embodiment, the construction is such that the optical diffraction surface is established on the first surface 16 (i.e., the surface nearest the light source) of the objective lens 8. Both surfaces of the objective lens 8 may be aspheric so as to favorably correct aberrations for both a CD-R and a DVD, thereby providing accurate focusing into a spot on the recording surface during recording/replaying no matter which media is used. More specifically, if light of a wavelength where the converging effect of the optical diffraction surface is large is incident onto the aspheric surface, the aspheric surface favorably corrects aberrations generated by the optical diffraction surface. Moreover, the design is such that the light flux of the other wavelength will be converged onto the other recording region with a converging effect from the optical diffraction surface that is small. In this situation, aberrations generated by the optical diffraction surface will be small. Hence, for either wavelength, the light is accurately converged to a spot at the required different positions.

The surface profile of the aspheric surface is given by Equation (2) below:

$$H=Y^2C/\{1+(1-KY^2C^2)^{1/2}\}+A_2Y^4+A_3Y^6+A_4Y^8+A_5Y^{10}+B \qquad \text{Equation (2)}$$

where

H is the distance to the tangent plane of the vertex of the aspherical surface from a point on the aspherical surface at height Y from the optical axis;

Y is the distance from the optical axis;

K is the eccentricity;

C is the curvature (i.e., C=1/R, where R is the paraxial radius of curvature) in the vicinity of the optical axis on the aspheric surface;

$A_2$, $A_3$, $A_4$ and $A_5$ are the aspheric coefficients; and,

B is a constant.

Therefore, the laser beam 11 from either the semiconductor laser 3 (at wavelength $\lambda_1$) or the semiconductor laser 4 (at wavelength $\lambda_2$) will be properly converged onto the recording region of a corresponding CD or DVD optical disc 9, due to the convex configuration of the objective lens 8, the aspheric surface configuration that is formed on both surfaces of the lens, and the effect of the above-mentioned optical diffraction surface. The difference in the amount of spherical aberration that is generated mainly depends on the difference in thickness of the CD versus DVD optical disc. The difference in the wavelength of the illuminating beams also has an influence. However, the aberration correction effect of the optical diffraction surface is able to favorably correct for the difference in spherical aberration resulting from the change of wavelength of the illuminating beam.

Furthermore, a specific grating pitch for the optical diffraction surface is established in consideration of the numerical aperture which is required in each optical disc 9. The step height of the saw-tooth configuration of the optical diffraction surface is established in consideration of the ratio of the diffraction light in each diffraction order depending on the wavelength of the illuminating laser beam. Further, there is no restriction associated with the maximum diameter of the optical diffraction surface other than it be sufficient to receive each illuminating laser beam. Thus, the maximum diameter of the optical diffraction surface may generally be determined according to the numerical aperture of the lens.

Figure 3C:
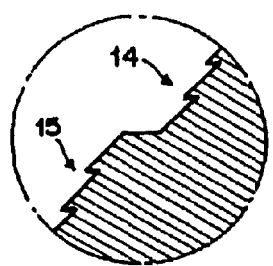

According to the present embodiment, as shown in FIGS. 1 and 2, the peripheral portion 14, which has a step difference of elevation from a central part 15, is formed in a peripheral region of a first surface 16 of the objective lens 8. FIG. 3(c) is an enlarged view of the cross-sectional structure of the region A of the first surface 16 shown in FIG. 3(a). The optical diffraction surface is formed on the first surface 16 with the step difference being as shown. However, the step difference is grossly exaggerated in each of FIG. 1, and FIG. 3(c) for purposes of illustration only, in that the actual step difference is very small.

As described above, the numerical apertures of the light beams for recording/replaying are different between CD-R and DVD optical recording media, with CD-R having a numerical aperture of 0.45 and DVD having a numerical aperture of 0.60, and the formation of the peripheral portion 14 enables an appropriate numerical aperture for either of these optical discs 9 to be provided. This will now be explained in the paragraph below.

The peripheral portion 14 is formed for the purpose of the aperture adjustment and functions so as to reduce/eliminate a quantity of light that passes at the periphery of a central light flux. It does this by causing destructive interference to occur between the central light flux and light flux in the peripheral portion for light of one of the two wavelengths that may form the laser beam 11, while maintaining a quantity of light at the periphery for light of the other wavelength wherein destructive interference does not occur or is small. By generating a predetermined phase difference between the two adjacent light fluxes for one of two wavelengths and a different predetermined phase difference for the other wavelength the aperture is reduced for one of the illuminating beams but not the other.

If a predetermined optical path difference exists between light passing through the peripheral portion 14 and light passing through adjacent portions other than the peripheral portion, an interference effect will be generated that reduces/weakens one of the light beams (e.g., that of wavelength $\lambda_1$) at its periphery so as to obtain a desired numerical aperture. Thus, the phase difference for wavelength $\lambda_1$ should be roughly an odd integer number times $\lambda_1/2$ for destructive interference to occur for the light of wavelength $\lambda_1$, and the phase difference for the other beam of wavelength $\lambda_2$ should be roughly an integer number times $\lambda_2$ so that destructive interference does not occur for this beam. However, when light having a Gaussian amplitude distribution is incident onto a lens, it is better to change the phase less. More specifically, the step difference is designed so as to generate a phase difference for the two light beams that satisfy the above Conditions (1) and (2).

Further, in order to obtain the necessary numerical aperture relative to the wavelength 780 nm ($\lambda_1$) and the wavelength 650 nm ($\lambda_2$), respectively, the numerical aperture at the boundary position between the central part 15 of the lens surface and the peripheral portion 14 is established to be a value that is between the numerical apertures established for each of the above-mentioned wavelengths.

More specifically, when the numerical aperture relative to the wavelength 780 nm ($\lambda_1$) is established as 0.45 and the numerical aperture relative to the wavelength 650 nm ($\lambda_2$) is established as 0.6, the boundary between the central part 15 and the peripheral portion 14 is established at the position where the numerical aperture is approximately 0.53. This results in destructive interference occurring at the wavelength $\lambda_1$ because the phase difference between the light of wavelength $\lambda_1$ which has passed through the peripheral portion 14 and the light which has passed through adjacent portions of the central part 15 differ in phase by an odd number times of $\lambda_1/2$ Thus, a quantity of light at the periphery of a central light flux is reduced/eliminated and the numerical aperture can be equivalent to 0.45. On the other hand, for light of wavelength 650 nm ($\lambda_2$), very little if any destructive interference occurs between light passing through the peripheral portion 14 and light passing through adjacent portions of the central part 15. Thus, the numerical aperture (0.6) of the objective lens is maintained for light of this wavelength.

As shown in FIG. 3(a), if a DVD 9a is arranged at a predetermined position (i.e., on the turntable) and recording/replaying is performed using the DVD 9a, a laser beam having a wavelength of 650 nm ($\lambda_2$) from the semiconductor laser 4 will be incident onto the objective lens 8 as substantially collimated light due to a collimator lens 7 (FIG. 2). However, the incident laser beam 11 will not be influenced by the existence of the peripheral portion 14, and its numerical aperture will be maintained as 0.6. Further, the laser beam will be converged onto the recording region 10a of the DVD 9a by the objective lens 8.

On the other hand, as shown in FIG. 3(b), if a CD-R 9b is arranged at a predetermined position (on the turntable) and the recording/replaying is performed using the CD-R 9b, a laser beam 11 of wavelength 780 nm ($\lambda_1$) from the semiconductor laser 3 will be incident onto the objective lens 8 as a substantially collimated light beam due to the light having passed through collimator lens 7 (FIG. 2). The light flux of the incident laser beam 11 will be reduced in intensity or eliminated outside a central region by the peripheral portion 14 due to destructive interference, and the numerical aperture will become equivalent to 0.45. The light will then be converged onto the recording region 10b on the CD-R 9b by the objective lens 8.

In the case of providing the required different numerical aperture light beams for recording/replaying at the two different wavelengths used for the CD-R versus DVD recording/replaying, when an optical diffraction element is used to create the smaller numerical aperture (such as a numerical aperture of 0.45 as required for CD recording/replaying), there is prior art which teaches obtaining a luminous flux having a desired numerical aperture by re-directing light that passes outside a given numerical aperture using a diffraction effect. However, according to this technology, the re-directed light is then reflected or scattered, and a portion of this light contributes to optical 'noise' that is detected by the optical pickup. Thus, there is an adverse effect on the quality of the recording or replaying. However, the present invention avoids such an optical 'noise' problem caused by light that passes outside a central region and that deleteriously affects the quality of recording/replaying.

As explained above, a predetermined optical diffraction surface is formed on the first surface 16 of the objective lens 8 for recording/replaying using an optical recording medium, and, a predetermined peripheral portion 14 for aperture adjustment is formed on this same surface. As a result, different numerical apertures are provided so that either a CD-R or DVD recording medium can be used, with each recording medium using a different numerical aperture and wavelength for the recording/replaying beam. Thus, there is no need to provide more complicated structures for changing the numerical aperture of the recording/replaying beam, such as by the interposition of an aperture diaphragm formed of a liquid crystal shutter, a wavelength selective filter, or by mechanically switching multiple diaphragms into the light path. Thus, light beams having different wavelengths and different numerical apertures that correspond to the proper wavelength and numerical aperture for CD versus DVD recording/replaying can be provided while maintaining a compact structure and a low price. Furthermore, the amount of the spherical aberration can be adjusted to that which is optimum for each wavelength of light beam, an accurate converging effect to a spot at the proper position can be obtained, and high quality recording/replaying can be achieved.

Even in the case of recording/replaying using any of the optical recording media, the present invention enables a light from a light source to be provided that is incident as a substantially collimated beam onto the objective lens 8, and to then accurately converge the light onto the recording region. Consequently, the objective lens 8 provides an accurate converging effect for any of the optical recording media that may be utilized. In the prior art, if a substantially collimated light beam were to be incident onto one optical recording medium (for example, a DVD), the construction is such that the objective lens would display the optimum converging effect. On the other hand, for the other optical recording medium (for example, the CD), construction is such that a light source for recording/replaying using the other optical recording medium would be arranged in a position where the optical performance is maximized.

However, the present invention enables a construction wherein light from a light source is substantially collimated as it is incident onto the objective lens 8 for any of the optical recording media that may be used. Such an arrangement provides greater freedom in design, since the position of the objective lens along the beam path no longer affects the focus distance from the objective lens to the optical recording medium. For example, this enables the distance between the collimated light source and the objective lens to be freely selected. Thus, in the case of changing the focus distance of the objective lens, it is no longer necessary to entirely change the design. Furthermore, the freedom of design is increased, for example, in the case of inserting a mirror between the light source and the objective lens. Such a design is also effective for providing a compact arrangement of components. In addition, the requirement for accuracy of assembly of the optical pickup device is eased, resulting in lower costs.

In the objective lens 8 according to the illustrated embodiment, the optical diffraction surface and the peripheral portion 14 are both formed on the first surface 16 of the objective lens. As an alternative in terms of the design, it is possible to form the optical diffraction surface and the peripheral portion 14, for example, on the second surface of the objective lens (i.e., the surface nearest the optical recording medium) or to form the optical diffraction surface on either surface of the objective lens and to form the peripheral portion on an opposite surface of the objective lens. Provided the optical diffraction surface and the peripheral portion are appropriately created, in theory these arrangements of components will provide the same effect as that of the illustrated embodiment.

However, the formation of the optical diffraction surface and the peripheral portion 14 on the first surface of the objective lens results in an easier design of the lens surface and easier processing. This design ensures that light rays which are substantially parallel to the optical axis are incident onto the first surface 16 so that the step difference between the optical diffraction surface and the peripheral portion, as shown in FIG. 1 and FIG. 3(c), can be formed by a surface which is roughly parallel to the optical axis. If the step surface is a surface that is substantially parallel to a principal ray of the incident light, there are advantages in minimizing wavefront aberrations, and thus the accuracy that the light can be condensed into a small spot is increased. Further, such a configuration makes forming the objective lens easier and enables higher accuracy of forming the objective lens.

Next, the objective lens 8 shall be discussed according to a disclosed embodiment. The objective lens 8 is usable no matter which particular type of optical recording medium (e.g., the various types of CDs verses a DVD) is used. FIGS. 3(a), 3(b) and 3(c) illustrate the objective lens 8 of the disclosed embodiment. An optical diffraction surface, as mentioned above, is formed on the first surface 16 of the objective lens 8, and a peripheral portion 14 for aperture adjustment is established as shown in FIG. 3(c) relative to the central part 15. Furthermore, in FIG. 3(c), for convenience of illustration, the optical diffraction surface having a saw-tooth configuration and the step difference between the central part 15 and the peripheral portion 14 are exaggerated in size. Further, both surfaces of the objective lens 8 are designed to be aspheric, and to have their surfaces defined by Equation (2) above. In the diagrams, 'X' indicates the optical axis.

As shown in FIG. 3(a), if the DVD 9a is arranged at a predetermined position (i.e., on the turntable) and recording/replaying is performed, a laser beam with a wavelength 650 nm ($\lambda_2$) is incident into the objective lens 8. The numerical aperture of this laser beam is 0.6 (i.e., the laser beam is not influenced by the existence of the peripheral portion 14) and the light is then converged onto the recording region 10a of the DVD 9a by the objective lens 8.

As shown in FIG. 3(b), if the CD-R 9b is arranged at the predetermined position and recording/replaying is performed, a laser beam with a wavelength 780 nm ($\lambda_1$) is incident into the objective lens 8. The numerical aperture of this laser beam is reduced to 0.45 because the flux at the periphery of a central region destructively interferes with the adjacent flux within the central region, and the light is then converged onto the recording region 10b of the CD-R 9b by the objective lens 8.

According to the present invention, the laser beam that is incident onto the objective lens 8 will be substantially collimated by a collimator lens no matter which wavelength light source is energized, and either light beam will be converged properly at the respective recording medium regardless of the difference in thickness of the protective layers for the two different recording media types, due to the difference in the converging effect by the optical diffraction surface for the two different wavelengths.

Table 1 below lists the surface number # in order from the light source side, the radius of curvature R, the on-axis spacing D between surfaces which depends on the wavelength used, either 650 nm or 780 nm, and the refractive index N for these same wavelengths of the objective lens 8 of this embodiment. Those surfaces listed with an asterisk to the right of the surface number # are aspheric, and have a surface profile as defined by Equation (2) above.

TABLE 1

| # | Radius of curvature (R) | On-axis surface spacing D for light source of wavelength: $\lambda = 650$ nm | $\lambda = 780$ nm | Refractive Index (N) for wavelength: $\lambda = 650$ nm | $\lambda = 780$ nm |
|---|---|---|---|---|---|
| 1* | 2.04638 | 2.25000 | 2.25000 | 1.50590 | 1.50239 |
| 2* | −6.23423 | 1.74000 | 1.37800 | 1.00000 | 1.00000 |
| 3 | ∞ | 0.60000 | 1.20000 | 1.58000 | 1.57000 |
| 4 | ∞ | | | | |

Surface #1 is the lens surface nearest the light source side that is aspheric in shape and includes the optical diffraction surface; surface #2 is the other lens surface, which is aspheric; and surfaces #3 and #4 are the surface of the disc nearest the light source and the other disc surface, respectively. When the lens surface is aspheric, the radius of curvature (R) listed is in the vicinity of the optical axis.

Table 2 below lists the constants and aspheric coefficients for Equation (2) above for each aspheric surface in the objective lens 8 of the disclosed embodiment, as well as the coefficients $W_1$–$W_5$ of the phase difference function of Equation (1) for the optical diffraction surface that is formed on surface #1.

TABLE 2

Surface #1:
Region within a distance of 1.841 mm of the optical axis:

$K = 0.0$
$C = 4.8866760 \times 10^{-1}$
$A_2 = 5.3626562 \times 10^{-3}$
$A_3 = -2.8123479 \times 10^{-4}$
$A_4 = 8.6568343 \times 10^{-5}$
$A_5 = -1.6751759 \times 10^{5}$
$B = 0.0$ Region outside a distance of 1.841 mm of the optical axis:

$K = 0.0$
$C = 4.8866760 \times 10^{-1}$
$A_2 = 5.3626562 \times 10^{-3}$
$A_3 = -2.8123479 \times 10^{-4}$
$A_4 = 8.6568343 \times 10^{-5}$
$A_5 = -1.6751759 \times 10^{5}$
$B = 0.00392$ TABLE 2-continued Optical Diffraction Surface $W_1 = 3.4406475$
$W_2 = -7.7182416$
$W_3 = -2.4500400$
$W_4 = 1.4322407 \times 10^{-1}$
$W_5 = 1.6008847 \times 10^{-2}$ Surface #2:

$K = 0.0$
$C = -1.6040465 \times 10^{-1}$
$A_2 = 1.8301403 \times 10^{-2}$
$A_3 = -3.9580859 \times 10^{-3}$
$A_4 = 3.4164515 \times 10^{-4}$
$A_5 = -3.5660099 \times 10^{6}$
$B = 0.0$ Table 3 below lists for each of a DVD or a CD series (such as CD-R) medium that may be used, the wavelength λ of the recording/replaying light, the focal length f, the diaphragm diameter, and the light source position.

TABLE 3

| | In the case of using a DVD | In the case of using a CD series |
|---|---|---|
| Wavelength λ used: | 650 nm | 780 nm |
| Focal length f: | 3.36 mm | 3.38 mm |
| Diaphragm diameter: | 4.06 mm | 4.06 mm |
| Light source position: | ∞ (i.e., incident light is collimated) | ∞ (i.e., incident light is collimated) |

FIG. 4(a) shows the wavefront aberration when the objective lens of the embodiment is used with an incident beam having a wavelength of 650 nm (i.e. with a DVD), and FIG. 4(b) shows the wavefront aberration when the same objective lens is used with an incident beam having a wavelength of 780 nm (i.e., with a CD series recording medium). As is apparent from viewing these wavefront aberration diagrams, a predetermined phase difference is generated at the boundary position between the central part 15 of the lens surface and the peripheral portion 14.

FIGS. 5(a) and 5(b) show beam intensity profiles of light which has been condensed by the objective lens of the present embodiment having a numerical aperture of 0.6, with FIG. 5(a) being for incident light at a wavelength λ=650 nm and FIG. 5(b) being for incident light at a wavelength λ=780 nm.

FIGS. 6(a) and 6(b) show beam intensity profiles of the light which has been condensed by a prior art objective lens which employs an aperture diaphragm so as to obtain a numerical aperture at 0.6 (FIG. 6(a)) or a numerical aperture at 0.45 (FIG. 6(b)). FIGS. 5(a) and 5(b) are drawn to the identical scale. FIG. 6(a) is drawn to the same scale as FIG. 6(b); however, the scale of FIGS. 5(a) and 5(b) versus 6(a) and 6(b) are different, with the scale of FIGS. 5(a) and 5(b) being larger both in the vertical and horizontal directions. As is apparent from viewing FIGS. 5(a)–6(b), the objective lens 8 relating to this embodiment has an almost similar beam profile to that of a conventional objective lens.

As explained above, in the objective lens for an optical recording medium of the present invention and in the optical pickup device using this objective lens, a predetermined optical diffraction surface is formed on the surface on the light source side of the objective lens, and a predetermined peripheral portion for aperture adjustment is established on this surface. A light flux, which enters substantially parallel to the optical axis, is converged to a spot at a predetermined position in the situation where the aberrations are favorably corrected, for any of two optical recording media that use two different wavelength light sources, due to the effect of this optical diffraction surface. Further, due to the effect of this peripheral portion, the quantity of light at the periphery of a central light flux is reduced/eliminated due to the interference effect for light of one wavelength, while the quantity of light is maintained for light of the other wavelength, thereby enabling different numerical apertures, which correspond to the two optical recording media that use the two different wavelength light sources.

Thus, an objective lens for an optical recording medium and an optical pickup device can be provided without the need for a complicated structure of the optical pickup device, the degree of freedom in the design is high, and the structure is not only compact but low in cost. At the same time, the numerical apertures that are appropriate for the two different optical recording media are provided by the objective lens.

The invention being thus described, it will be obvious that the same may be varied in many ways. For example, the objective lens of the invention is not limited to that of the disclosed embodiment, as various modifications thereto are possible. In the optical pickup device of the present invention, the optical recording medium is not limited to DVDs and CD-Rs, but can be other optical recording media that have different specifications with regard to wavelength and numerical aperture, but which use a common optical pickup device. It is also possible to apply the present invention even if the disc thickness of the two media is the same so long as the two optical recording media have different specifications regarding wavelength and numerical aperture and the optical diffraction surface and the peripheral portion on the objective lens surface are established based upon these differences. Further, a plastic material can be used to form the objective lens instead of using glass. Although the above-discussed embodiment employs aspheric surfaces on both surfaces of the objective lens, it is possible to omit one or both of the aspheric surfaces and instead use spherical surfaces. Further, as mentioned previously, the step at the periphery of the central region can be higher in surface elevation than the average surface height in the central region or it may be lower in surface elevation than the average surface height in the central region.

Concerning the optical diffraction surface, rather than providing a large converging effect for one wavelength and a small converging effect for the other wavelength, a diverging effect could instead be provided. Also, instead of having a single step (of higher or lower height) on the optical diffraction surface in a peripheral region, it is also possible to use an annular region or regions with two or more steps. In addition, rectangular cross-sectional configurations are also possible.

As a manufacturing method for the optical diffraction surface of the objective lens, glass or plastic may be used for the lens base material with titanium dioxide ($TiO_2$) being deposited onto the lens base material. Or, it is also possible to form the optical diffraction surface by depositing various materials, such as metal or metal oxide on the lens surface of the objective lens. In addition, instead of using titanium dioxide ($TiO_2$), a nonmetal material may be deposited. Further, instead of using a deposition method to form the optical diffraction surface, it is also possible to use sputtering, plating, or a roll-coating method to form the optical diffraction surface.

Rather than the optical pickup device having, for example, different LED's that are selectively energized so as to obtain a selected wavelength output, it is also possible to provide a single light emitter having an output wavelength that can be varied. In addition, it is possible to omit the collimator lens. If a grating is inserted between the semiconductor lasers and the partially reflective mirror, it is possible to detect the tracking error utilizing three beams.

Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An objective lens for converging with a first numerical aperture incident light of a first wavelength and for converging with a second numerical aperture incident light of a second wavelength, said objective lens comprising:

an optical diffraction surface formed on a surface of the objective lens nearest a light source, said optical diffraction surface providing one of a diverging effect or a converging effect that is small for incident light of the first wavelength so that said light is converged at a first predetermined position by both a diffractive effect and the refractive power of the objective lens, and said optical diffraction surface providing a diverging effect or a converging effect that is large for incident light of the second wavelength so that said light is converged at a second predetermined position by both the diffractive effect and the refractive power of the objective lens;

a peripheral portion for aperture adjustment that is established on the surface of the objective lens nearest a light source, said peripheral portion being structured so that, if the light source emits wavelengths equal to that of either the first wavelength or the second wavelength, the peripheral portion for aperture adjustment functions so as to reduce/eliminate a quantity of light at the periphery of a central light flux due to an interference effect for light having a wavelength $\lambda_1$, and functions so as to maintain a quantity of light at a periphery of a central light flux for light having a wavelength $\lambda_2$, the peripheral portion being provided with a step difference where light which passes through a position equivalent to the peripheral portion in the case when it is assumed that the peripheral portion does not exist, and a light which passes through a position where the peripheral portion exists, generate a phase difference so as to satisfy the following Conditions (1) and (2)

$\Delta_{\lambda 1}=(2m+1)\lambda_1/2+\delta 1$ \hfill Condition (1)

$\Delta_{\lambda 2}=n\lambda_2+\delta 2$ \hfill Condition (2)

and, the numerical aperture at the location of a boundary of the step difference has a value between the first numerical aperture and the second numerical aperture, where $\Delta_{\lambda 1}$ is the phase difference, for light of wavelength $\lambda_1$, between light passing through a position equivalent to that of the peripheral portion in the case when it is assumed that the peripheral portion does not exist, and light passing through a position where the peripheral portion is formed;

$\Delta_{\lambda 2}$ is the phase difference, for light of wavelength $\lambda_2$, between light passing through a position equivalent to that of the peripheral portion in the case when it is assumed that the peripheral portion does not exist, and light passing through the position where the peripheral portion is formed;

m and n are integers;

δ1 is a phase shift amount at the wavelength $\lambda_1$, with $|\delta1|<0.2\,\lambda_1$; and, δ2 is a phase shift amount at the wavelength $\lambda_2$, with $|\delta2|<0.2\,\lambda_2$.

2. The objective lens according to claim 1, wherein an aspheric surface is formed either only on the surface of the objective lens nearest the light source or on both surfaces of the objective lens.

3. The objective lens according to claim 1, wherein:

the thickness of the substrate of the second optical recording medium is greater than the thickness of the substrate of the first optical recording medium; and the following Condition (3) is satisfied:

$$\lambda_1 > \lambda_2 \qquad \text{Condition (3)}$$

where $\lambda_2$ is the wavelength of incident light at the first wavelength, and $\lambda_1$ is the wavelength of incident light at the second wavelength.

4. The objective lens according to claim 2, wherein:

the thickness of the substrate of the second optical recording medium is greater than the thickness of the substrate of the first optical recording medium; and the following Condition (3) is satisfied:

$$\lambda_1 > \lambda_2 \qquad \text{Condition (3)}$$

where $\lambda_2$ is the wavelength of incident light at the first wavelength, and $\lambda_1$ is the wavelength of incident light at the second wavelength.

5. The objective lens according to claim 1, wherein the optical diffraction surface is comprised of a concentric circle grating that has a saw-tooth cross-sectional configuration.

6. The objective lens according to claim 2, wherein the optical diffraction surface is comprised of a concentric circle grating that has a saw-tooth cross-sectional configuration.

7. The objective lens according to claim 3, wherein the optical diffraction surface is comprised of a concentric circle grating that has a saw-tooth cross-sectional configuration.

8. The objective lens according to claim 4, wherein the optical diffraction surface is comprised of a concentric circle grating that has a saw-tooth cross-sectional configuration.

9. The objective lens according to claim 1, wherein the incident light of the first wavelength and the incident light of the second wavelength are substantially collimated light beams.

10. The objective lens according to claim 2, wherein the incident light of the first wavelength and the incident light of the second wavelength are substantially collimated light beams.

11. The objective lens according to claim 3, wherein the incident light of the first wavelength and the incident light of the second wavelength are substantially collimated light beams.

12. The objective lens according to claim 4, wherein the incident light of the first wavelength and the incident light of the second wavelength are substantially collimated light beams.

13. The objective lens according to claim 5, wherein the incident light of the first wavelength and the incident light of the second wavelength are substantially collimated light beams.

14. The objective lens according to claim 6, wherein the incident light of the first wavelength and the incident light of the second wavelength are substantially collimated light beams.

15. The objective lens according to claim 7, wherein the incident light of the first wavelength and the incident light of the second wavelength are substantially collimated light beams.

16. The objective lens according to claim 8, wherein the incident light of the first wavelength and the incident light of the second wavelength are substantially collimated light beams.

17. An optical pickup device that includes the objective lens as set forth in claim 1.

18. An optical pickup device that includes the objective lens as set forth in claim 2.

19. An optical pickup device that includes the objective lens as set forth in claim 3.

20. An optical pickup device that includes the objective lens as set forth in claim 4.

21. An optical pickup device that includes the objective lens as set forth in claim 5.

22. An optical pickup device that includes the objective lens as set forth in claim 6.

23. An optical pickup device that includes the objective lens as set forth in claim 7.

24. An optical pickup device that includes the objective lens as set forth in claim 8.

25. An optical pickup device that includes the objective lens as set forth in claim 9.

26. An optical pickup device that includes the objective lens as set forth in claim 10.

27. An optical pickup device that includes the objective lens as set forth in claim 11.

28. An optical pickup device that includes the objective lens as set forth in claim 12.

29. An optical pickup device that includes the objective lens as set forth in claim 13.

30. An optical pickup device that includes the objective lens as set forth in claim 14.

31. An optical pickup device that includes the objective lens as set forth in claim 15.

32. An optical pickup device that includes the objective lens as set forth in claim 16.

* * * * *

UNITED STATES PATENT AND TRADEMARK OFFICE
CERTIFICATE OF CORRECTION

PATENT NO.   : 6,781,771 B2
DATED        : August 24, 2004
INVENTOR(S)  : Kitahara et al.

It is certified that error appears in the above-identified patent and that said Letters Patent is hereby corrected as shown below:

Column 11,
Lines 58 and 65, change "$A_5 = -1.6751759 \times 10^5$" to -- $A_5 = -1.6751759 \times 10^{-5}$ --; and Column 12,
Line 15, change "$A_5 = -3.5660099 \times 10^6$" to -- $A_5 = -3.5660099 \times 10^{-6}$ --.

Signed and Sealed this

Seventh Day of December, 2004

JON W. DUDAS
*Director of the United States Patent and Trademark Office*